United States Patent
Ham

(10) Patent No.: US 7,640,449 B2
(45) Date of Patent: Dec. 29, 2009

(54) SYSTEMS AND METHODS FOR DYNAMIC CLOCK FREQUENCIES FOR LOW POWER DESIGN

(75) Inventor: Jung Hoon Ham, Arlington, TX (US)

(73) Assignee: Via Technologies, Inc., Hsin-Tien, Taipei (TW)

(\*) Notice: Subject to any disclaimer, the term of this patent is extended or adjusted under 35 U.S.C. 154(b) by 465 days.

(21) Appl. No.: 11/465,148

(22) Filed: Aug. 17, 2006

(65) Prior Publication Data
US 2008/0046773 A1  Feb. 21, 2008

(51) Int. Cl.
G06F 1/00 (2006.01)
G06F 13/00 (2006.01)
G06F 1/04 (2006.01)

(52) U.S. Cl. .................. 713/501; 713/500; 713/600

(58) Field of Classification Search ............ 713/501
See application file for complete search history.

(56) References Cited

U.S. PATENT DOCUMENTS 6,519,711 B1 * 2/2003 Fischer et al. ............... 713/500
6,948,086 B2 * 9/2005 Iwasa ........................ 713/500

* cited by examiner

*Primary Examiner*—Thomas Lee
*Assistant Examiner*—Matthew S Dori
(74) *Attorney, Agent, or Firm*—Thomas, Kayden, Horstemeyer & Risley

(57) ABSTRACT

Circuits for generating multiple clocks for computer systems are disclosed. One such system includes a circuit configured to generate a core clock, a system bus clock, and a peripheral clock. The frequency of one of the clocks can be reduced or altered without altering the frequencies at which the other clocks oscillate. Also disclosed are methods for incorporating or utilizing the disclosed circuits.

21 Claims, 6 Drawing Sheets

SYSTEMS AND METHODS FOR DYNAMIC CLOCK FREQUENCIES FOR LOW POWER DESIGN

TECHNICAL FIELD

The present disclosure generally relates to generating clocks for a computer system. More specifically, the disclosure is related to systems and methods for generating multiple clocks oscillating at multiple frequencies for a computer system.

BACKGROUND

Processors (e.g., microprocessors, CPUs, cores, etc.) are used in a wide variety of products and applications, from desktop computers to portable electronic devices, such as cellular phones, laptop computers, and PDAs (personal digital assistants). Some processors are extremely powerful (e.g., processors in high-end computer workstations), while other processors have a simpler design, for lower-end, less expensive applications and products.

There is a general dichotomy between performance and power. Generally speaking, high-performance processors having faster operation and/or more complex designs tend to consume more power than their lower-performance counterparts. Higher power consumption generally leads to higher operating temperatures and shorter battery life (for devices that operate from battery power). The ever-increasing demand and use of portable electronic devices is driving a demand to produce processors that realize lower-power operation, while at the same time maintaining satisfactory performance levels.

More than one clock can be internal to a computer system, including but not limited to: a CPU or core clock, a system bus clock, and a peripheral clock. A core clock dictates the speed at which the CPU or core in a computer system or a system on chip (SoC) operates. A system bus clock dictates the speed at which the system bus operates. A peripheral clock dictates the speed at which the peripheral or input/output (I/O) bus operates. These clocks can operate at different speeds because, for example, a CPU often operates at a faster speed relative to the system bus or a peripheral bus. As noted above, where high-speed performance is not required, lower clock speeds may be desirable for lower power consumption.

In systems where a synchronous clock is desirable or necessary, the clocks internal to a computer system are typically linked by being dependent upon the same clock source to derive a clock at the proper frequency. Further, the clocks are typically arranged in a cascading fashion, whereby the fastest clock derives its clock directly from an oscillator or other clock source, and the next fastest clock derives its clock from the fastest clock. In a non-limiting example of a computer system requiring a core clock, a system bus clock slower than the core clock, and a peripheral clock slower than the system bus clock, the core clock may be derived from the clock source by inputting the clock into a programmable divider circuit. The system bus clock may be derived from the core clock, and the peripheral clock may be derived from the bus clock. This cascading arrangement can be desirable for the system to maintain synchronization between the three clocks. FIG. 1 depicts the clock generation components of such an exemplary system.

Unfortunately, this arrangement may lead to wasted power. One scenario in which power can be wasted in a computer system relates to these one or more clocks internal to the computer system. As is known in the art, a computer system will generally consume more power at higher clock speeds, so while higher clock speeds often equate to higher performance, higher clock speeds also equate to higher power consumption, which is particularly relevant in battery-powered systems that need to balance speed and power for usability. As one non-limiting example of a scenario where power is wasted in a computer system, the CPU clock can be oscillating at its normal frequency when it is unnecessary, for example, when the CPU is waiting for an operation by a peripheral or system bus device to complete. In such a scenario, it is possible for a CPU to be performing little or no useful operations other than waiting for a peripheral or system bus device to complete an operation or return a result.

One solution for reducing the power consumption of a computer system involves reducing the frequency of a core clock when it is not necessary for the core clock to be oscillating at its normal frequency. However, in a computer system with a cascading arrangement of circuits designed to produce synchronous clocks, such as the aforementioned example, reducing the frequency of a core clock will also reduce the frequency of the system bus and peripheral clocks because they are derived from the core clock. In the abovementioned scenario where a CPU is waiting for a peripheral or bus operation to complete, this will result in lower performance of the system because the peripheral and system bus clocks would be slowed, despite the fact that the system bus and/or peripheral bus is busy conducting an operation.

Another drawback of reducing power consumption by reducing a core clock frequency during periods when a CPU is substantially idle is that for a system as in the aforementioned example depicted in FIG. 1, the programmable clock dividers used to derive a clock signal often require one or more instructions to configure. Reducing the core clock frequency to conserve power in such a system would require the execution of one or more instructions to reprogram a programmable clock divider to lower the clock frequency, and subsequently one or more instructions to resume the normal or higher speed clock frequency, which is a less than ideal proposition.

Accordingly, there is a heretofore unaddressed need to overcome the deficiencies and shortcomings described above.

SUMMARY

Included herein are systems and methods for reducing power consumption within a computer system. The systems may include a first programmable clock divider configured to accept a clock source and output a first clock signal. Also included is a first divider circuit configured to accept the first clock signal and output a first divided clock signal of a lower frequency relative to the first clock signal. The systems may also include a first switching circuit configured to accept the first divided clock signal and the first clock signal as inputs and output one of the inputs as a first output clock signal in response to a first switching signal.

The methods may include dividing a clock source with a first programmable clock divider and producing a first clock signal, further dividing the first clock signal with a first divider circuit into a first low-power clock signal. The methods may also include inputting the first clock signal and the first low-power clock signal into a first clock switch configured by a first clock switch selection signal to select an output from among its inputs. Also included is selecting one from among the first clock signal and the first low-power clock signal with the first clock switch selection signal and outputting it as the first output clock signal.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
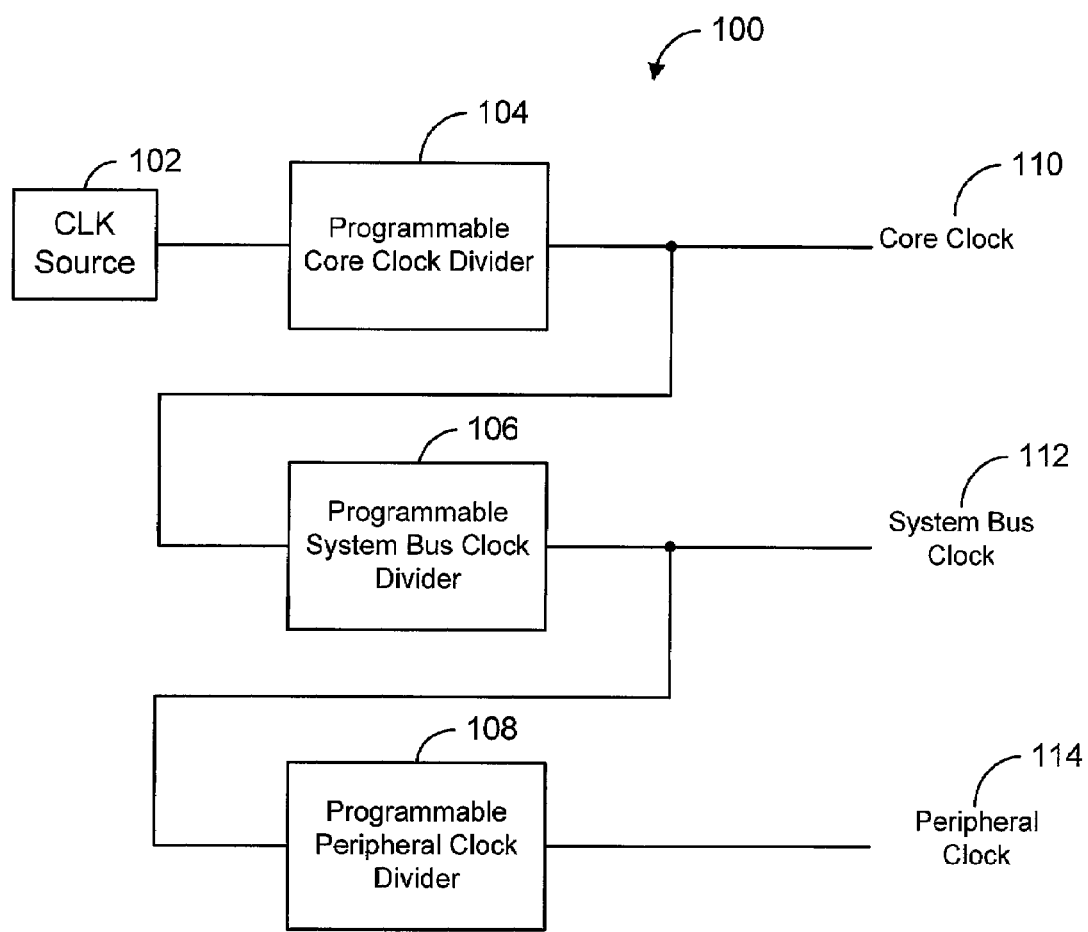
FIG. 1 is a functional block diagram of computer system clock generating components, as is known in the prior art.

The present disclosure generally relates to computer systems having improved clock generation capabilities. In accordance with one embodiment, a programmable core clock divider receives a clock source from which it derives and outputs a core clock signal. This core clock signal is subsequently divided by a divider circuit, which outputs a low-power core clock signal. The core clock signal and the low-power core clock signal are then inputted to a core clock switch, the core clock is outputted from the core clock switch with the proper frequency, either normal or low-power, is selected by a core clock selection switch.

Depending on whether a normal operation or low-power operation of the CPU or core is desired by the system or a piece of software, the core clock selection switch can be toggled to choose between normal and low-power operation. Relative to reprogramming the programmable core clock divider, this presents a simpler and faster alternative to reducing power consumption in the system because programming the programmable core clock divider often requires one or more instructions to execute. As is known in the art, an instruction execution may require multiple clock ticks to complete. Operating with a reduced core clock frequency when the computer system or software so desires saves power.

In accordance with one embodiment, in systems where a synchronous clock is desired, the core clock signal can act as an input to a programmable system bus clock divider that derives a system bus clock signal. Similarly, the system bus clock signal is divided by a divider circuit to derive a low-power system bus clock signal and using a system bus clock selection switch, the signal with a proper frequency is selected with a system bus clock selection signal and outputted as the system bus clock. The system bus clock can also act as an input to a programmable peripheral clock divider that derives a peripheral clock signal. The peripheral clock signal is also divided by a divider circuit to derive a low-power peripheral clock signal and using a peripheral clock selection switch, the signal with the desired frequency is selected with a peripheral clock selection signal and outputted as the peripheral clock.

Other systems, methods, features, and/or advantages will be or may become apparent to one with skill in the art upon examination of the following drawings and detailed description. It is intended that all such additional systems, methods, features and/or advantages be included within this description and be protected by the accompanying claims.

Having summarized various aspects of the present disclosure, reference will now be made in detail to the description as illustrated in the drawings. While the disclosure will be described in connection with these drawings, there is no intent to limit it to the embodiment or embodiments disclosed therein. On the contrary, the intent is to cover all alternatives, modifications, and equivalents included within the spirit and scope of this disclosure as defined by the appended claims. It should be emphasized that many variations and modifications may be made to the above-described embodiments. All such modifications and variations are intended to be included herein within the scope of this disclosure and protected by the claims following this disclosure.

FIG. 1 represents a framework known in the art for generating clocks internal to a computer system. In this non-limiting exemplary representation, the programmable core clock divider 104 represents a programmable clock divider circuit that derives a core clock 110 from the clock source 102. The core clock 110 is also used as the source or input from which a system bus clock 112 is derived by the programmable system bus clock divider 106, which is a programmable clock divider. Similarly, the system bus clock 112 is used as the source or input from which a peripheral clock 114 is derived by the programmable peripheral clock divider 108, which is a programmable clock divider circuit.

One way to reduce the power consumption of a computer system employing the clock generation framework of FIG. 1 is to reduce the frequency of the core clock 110. It would be appreciated by one of ordinary skill in the art that the power consumption of a computer system can be reduced by employing a reduced CPU or core clock frequency when the CPU or core is underutilized or not utilized. Such a situation can arise particularly during periods where the CPU or core is waiting for an operation on the system bus or the peripheral bus to be completed. This can be referred to as placing the computer system in a low-power mode. However, it would be appreciated that placing a computer system in a low-power mode by reducing the frequency of the core clock would also have a performance tradeoff because this also reduces the speed at which a CPU or core operates.

Reducing the frequency of the core clock 110 requires reprogramming the programmable core clock divider 104 to derive a lower frequency core clock 110 from the clock source 102. This is an operation that can require one or more instructions to be executed by the computer system because the proper data indicating a new frequency must be loaded into the programmable core clock divider 104. Reducing the frequency of the core clock 110 in the depicted framework also alters the frequency of the inputs used to derive the system bus clock 112 and the peripheral clock 114. This may result in a reduced frequency of the system bus clock 112 and the peripheral clock 114. It would be appreciated that reducing the frequency of the system bus clock 112 and peripheral clock 114 may be undesirable if a CPU or core is waiting for an operation on the system bus or peripheral bus to complete because reducing the frequency of the system bus clock 112 or peripheral clock 114 would cause the operation to proceed slower. Further, because derivation of the system bus clock 112 and peripheral clock 114 are dependent upon the core clock 110, the frequencies to which core clock 110 can be reduced may be limited in order to maintain compatibility with system bus and peripheral bus devices.

Figure 2:
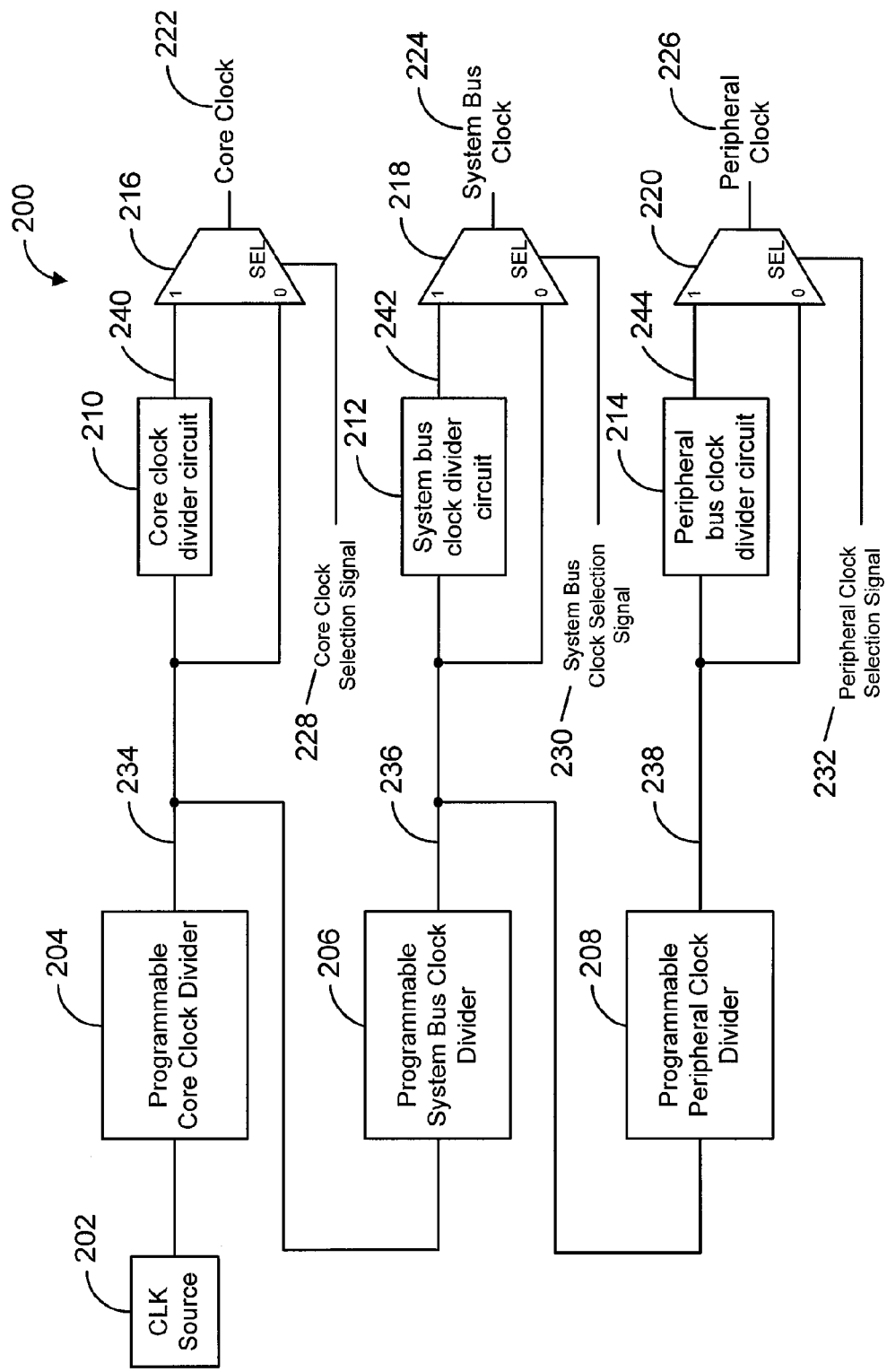
FIG. 2 is a functional block diagram of an embodiment of the disclosure.

FIG. 2 represents a functional block diagram of one embodiment according to the present disclosure. In this non-limiting exemplary embodiment, the system 200 enables software or the computer system to independently adjust the frequencies of the core clock 222, the system bus clock 224 and the peripheral clock 226, while maintaining a framework that provides for synchronization among the clocks utilized in the computer system. The embodiment also allows the computer system or software to reduce the frequency of one or more of a computer system's clocks without reducing the frequency the computer system's remaining clocks, thereby reducing power consumption while allowing for normal performance levels of components relying on clocks that are not reduced. The programmable core clock divider 204 derives a core clock signal 234 from a clock source 202. A core clock divider circuit 210 derives a low-power core clock signal 240 from the core clock signal 234. The core clock switch 216 receives as inputs from both the core clock signal 234, which oscillates at a higher frequency relative to the low-power core clock signal 240, and the low-power core clock signal 240. The output of the core clock switch 216 acts as the core clock 222.

Figure 2A:
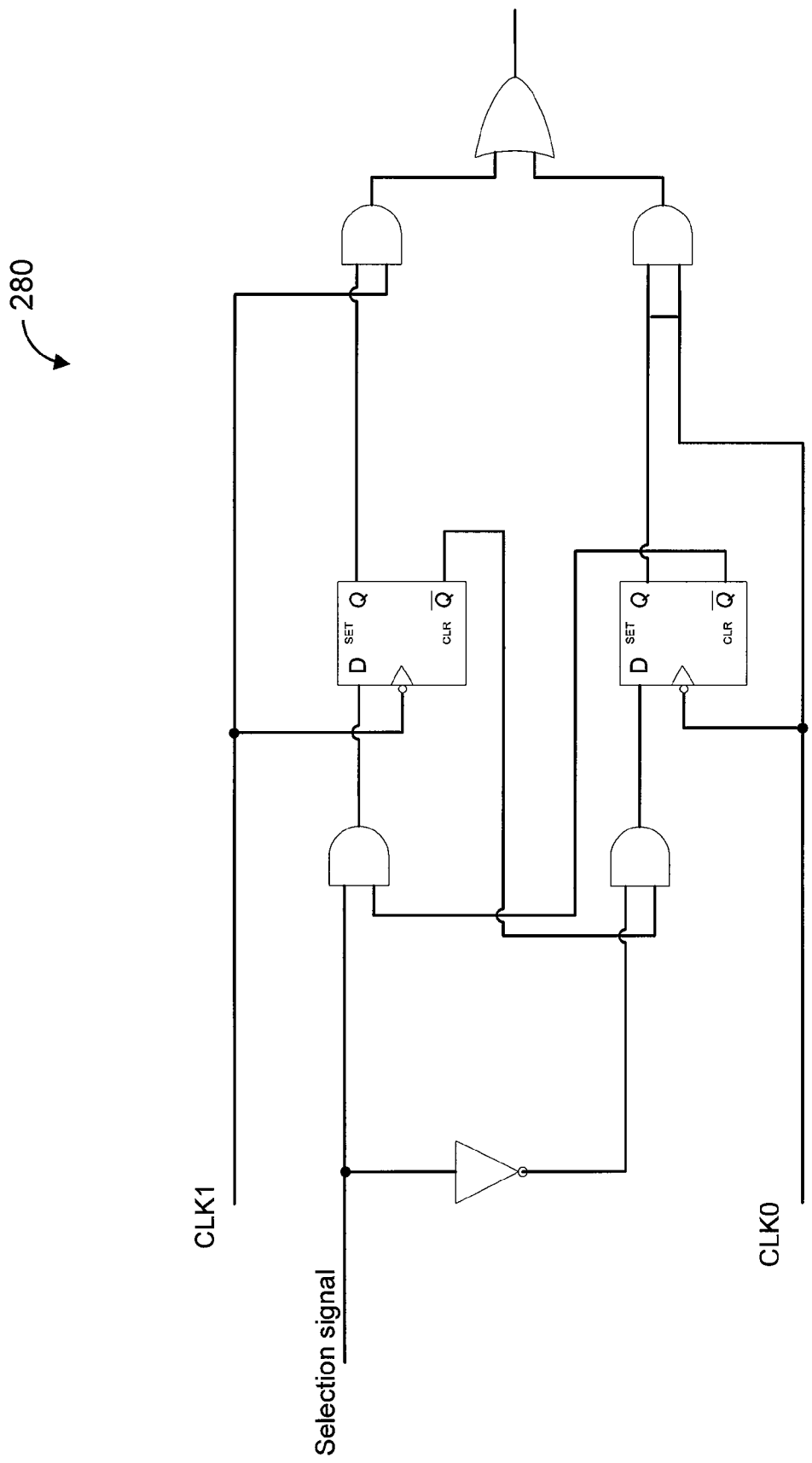
FIG. 2A is a digital schematic diagram of a component compatible with an embodiment of the disclosure.

The core clock switch 216 enables the computer system or software to operate a CPU or core in low-power mode at a lower clock frequency relative to normal operation. This is achieved by toggling the core clock selection signal 228 from selecting the core clock signal 234 to selecting the low-power core clock signal 240 as the output of the core clock switch 216. An embodiment of the disclosure allows a computer system or software to operate a computer system in low-power mode by reducing any of its clock frequencies without the delay and increased complexity of reprogramming a programmable clock divider. In a preferred embodiment the clock switches 216, 218, and 220 are multiplexers. However, it would be appreciated that any other switching device known in the art could be used consistent with the invention to allow for selection between the core clock signal and the low-power core clock signal, such as, a substantially glitch-free clock switch 280 as depicted in FIG. 2A. As is known in the art, a glitch can occur when the output of a digital circuit changes more than once in response to a single change in the input variables of the digital circuit. A glitch can also occur when there is any undesired or unintended behavior of a digital circuit output in response to the digital circuit inputs or the changing of digital circuit inputs. It would be appreciated that a substantially glitch-free clock switch 280 may be desirable to act as a clock switch in accordance with an embodiment of the disclosure in order to reduce or eliminate potential glitches in the clocks generated by an embodiment of the disclosure.

The programmable system bus clock divider 206 in the embodiment depicted in FIG. 2 derives a system bus clock signal 236 from the core clock signal 234 rather than from the core clock 222 directly. This allows the computer system to choose a low-power core clock frequency without altering the frequency of system bus 224 or peripheral clocks 226 while still maintaining a cascading framework that allows the computer system to employ synchronous clocks. A system bus clock divider circuit 212 derives a low-power system bus clock signal 242 from the system bus clock signal 236. The system bus clock switch 218 receives both the system bus clock signal 236, which oscillates at a higher frequency relative to the low-power system bus clock signal 242, and the low-power system bus clock signal 242. The output of the system bus clock switch 218 acts as the system bus clock 224. The system bus clock switch 218 enables the computer system or software to operate a system bus in low-power mode at a lower clock frequency relative to normal operation. This is achieved by toggling the system bus clock selection signal 230 from selecting the system bus clock signal 236 to selecting the low-power system bus clock signal 242 as the output of the system bus clock switch 218.

The programmable peripheral clock divider 208 derives a peripheral clock signal 238 from the system bus clock signal 236. A peripheral clock divider circuit 214 derives a low-power peripheral clock signal 244 from the peripheral clock signal 236. The peripheral clock switch 220 receives as inputs both the peripheral clock signal 238, which oscillates at a higher frequency relative to the low-power peripheral clock signal 244, and the low-power peripheral clock signal 244. The output of the peripheral clock switch 220 acts as the peripheral clock 226. The peripheral clock switch 220 enables the computer system or software to operate the peripheral bus in low-power mode at a lower clock frequency relative to normal operation. This is achieved by toggling the peripheral clock selection signal 232 from selecting the peripheral clock signal 238 to selecting the low-power peripheral clock signal 244 as the output of the peripheral clock switch 220.

Figure 3:
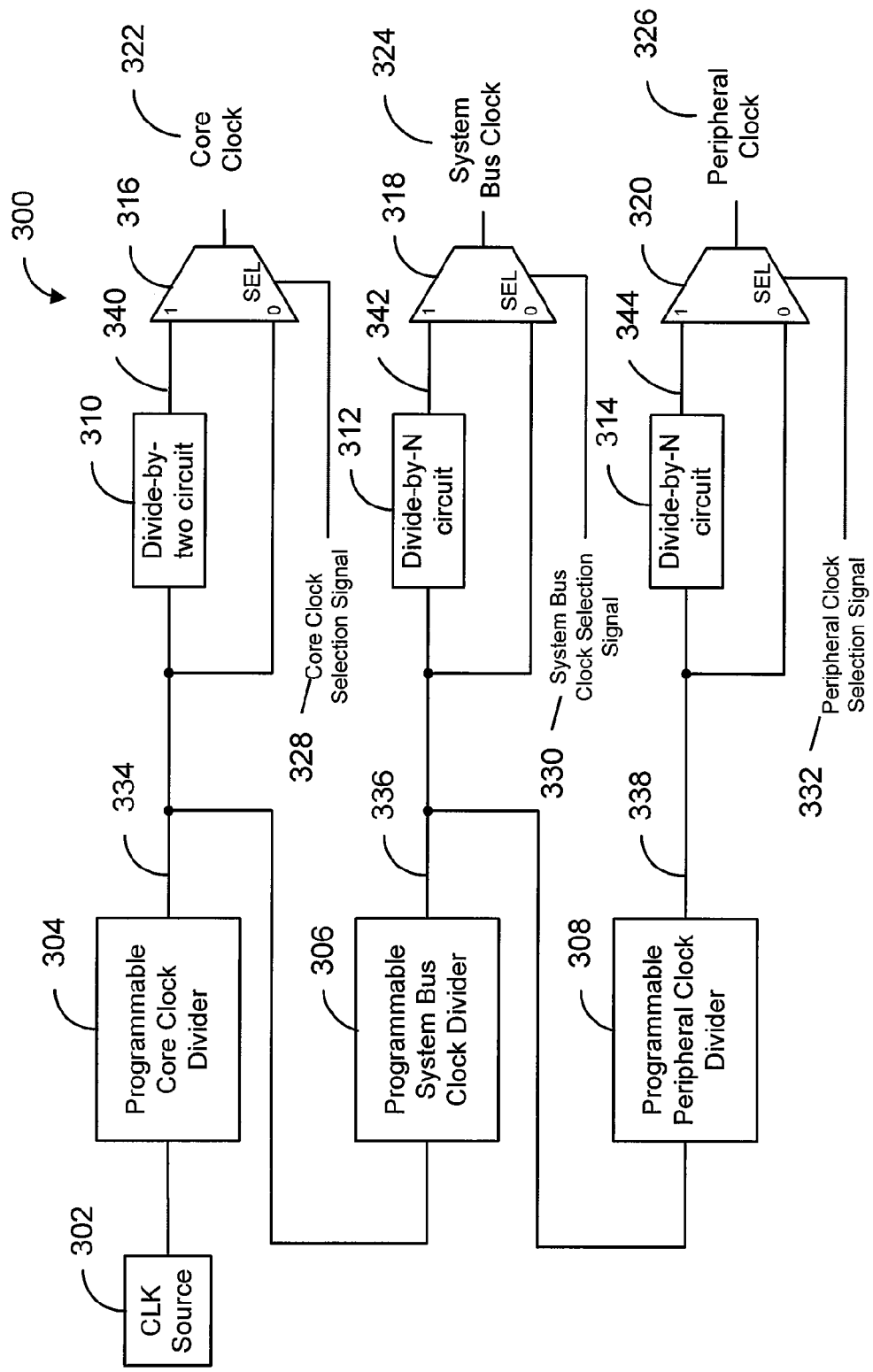
FIG. 3 is a functional block diagram of an embodiment of the disclosure.

FIG. 3 illustrates block diagram 300, which is a variation from block diagram 200 in FIG. 2. In this non-limiting exemplary embodiment, the system enables software or the computer system to independently adjust the frequencies of the core clock 322, the system bus clock 324 and the peripheral clock 326, while maintaining a framework that provides for synchronization among the clocks utilized in the computer system. In this embodiment the system has a divide-by-two circuit 310 that derives a low-power core clock signal 340 from the core clock signal 334. Therefore, in this embodiment, if the core clock selection signal 328 is toggled to select the low-power core clock signal as the core clock 322, the core clock 322 will operate at fifty percent of its normal operating frequency.

Further, the system includes a divide-by-N circuit 312 and a divide-by-N circuit 314 that derive the low-power system bus clock signal 342 and low-power peripheral clock signal 344, respectively. The divide-by-N circuits 312 and 314 divide an input clock signal by an amount N such that the output signal of the divide-by-N circuits 312 and 314 maintains compatibility with the system bus or peripheral bus. For example, the divide-by-N circuit 312 divides the system bus clock signal 336 by an amount N that maintains compatibility with the system bus of the computer system should the system select the low-power system bus clock signal 342 as the system bus clock 324. Also, the divide-by-N circuit 314 divides the peripheral clock signal 338 by an amount N that maintains compatibility with the peripheral bus of the computer system should the system select the low-power peripheral clock signal 344 as the peripheral clock 326. It would be apparent to one of ordinary skill in the art that the circuits 310, 312, and 314 can be chosen to divide an input clock signal by a variety of numbers that can be chosen to optimize the tradeoff between performance and power savings while maintaining compatibility with the system's CPU or core, system bus and peripheral bus, and it is not the intent of this disclosure to limit the selection of divider circuits to those pictured.

Figure 4:
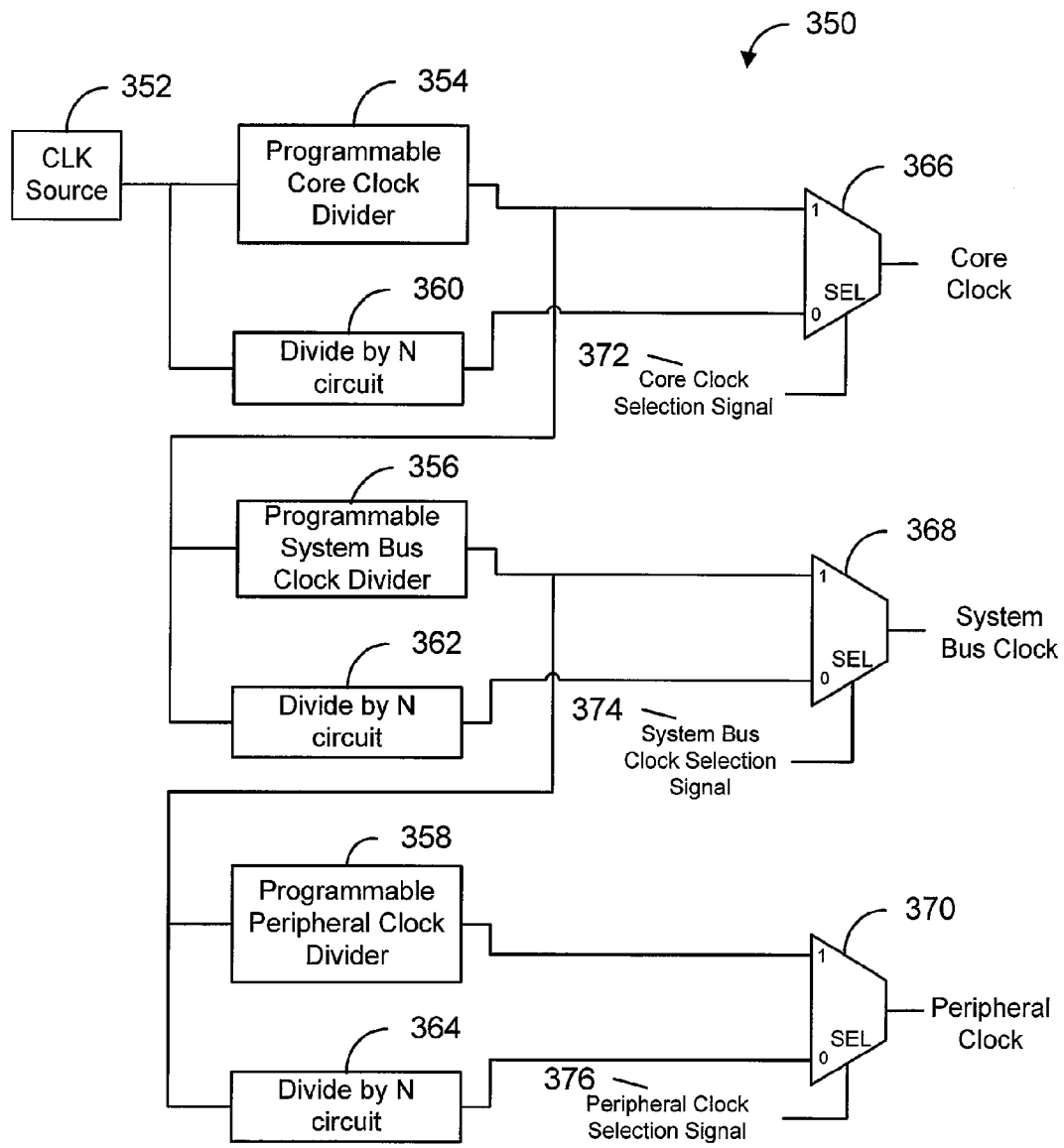
FIG. 4 is a functional block diagram of an alternative embodiment of the disclosure.

FIG. 4 illustrates yet another alternative framework that can be employed in an embodiment 350 of the disclosure. In the depicted embodiment 350 a clock source 352 is input to a programmable core clock divider 354 as well as a divide by N circuit 360, where N is a number greater than one to produce a lower frequency clock signal. Preferably, the core clock divider 352 will generate a clock signal with a frequency higher relative to the frequency of the divide by N circuit 360. The outputs of both divider circuits 352, 360 are inputs to a clock selection switch 366. The clock selection switch 366 can be implemented as a multiplexer, a substantially glitch free selection switch or other selection or switch mechanisms known in the art. The core clock selection signal 370 can be toggled to select between a lower frequency clock signal output by the divide by N circuit 360 or a clock signal output by the programmable core clock divider 354, depending on whether a low power or a normal clock frequency is desired for the core clock. The output of the clock selection switch 366 can be utilized as the core clock similarly to the above disclosed embodiments of FIGS. 2 and 3.

The embodiment 350 also includes an additional programmable system bus clock divider 356. The input of the clock divider 356 is the output of the programmable core clock divider 354. Similarly, the input of the divide by N circuit 362 is also the output of the programmable core clock divider 354. The divide by N circuit outputs a lower frequency signal relative to the programmable system bus clock divider 356. The output of each divider circuit is input into a clock selection switch 368, which can choose between the higher and lower frequency signal by toggling a system bus clock selection signal 372. The output of the clock selection switch 368 can be utilized as a system bus clock for a computer system.

The embodiment 350 also includes a programmable peripheral clock divider 358 and an additional divide by N circuit 364. The inputs of these clock divider circuits are the output of the programmable peripheral clock divider 356. The divide by N circuit 364 preferably outputs a lower frequency signal relative to the programmable peripheral clock divider 358. The outputs of these two divider circuits are inputs to a clock selection switch 370. The output of the clock selection switch 370 can be selected by toggling a peripheral clock selection signal 376. In this manner, a lower power or a normal clock signal can be selected with the use of the selection signal 376. The embodiment of FIG. 4 achieves similar results to the above disclosed embodiments of FIGS. 2 and 3, though it should be appreciated that the implementation varies slightly. Further, as is evident to one of ordinary skill in the art, the embodiments depicted in FIGS. 2, 3, and 4 are representations of a particular framework for clock generation. The descriptions are not intended to limit the present disclosure, as various representations would be evident, for example, the system need not necessarily apply a cascading framework for the generation of three synchronous clocks. It would be apparent to one of ordinary skill in the art that the teachings disclosed herein could be applied to a computer system requiring more or fewer clocks.

Figure 5:
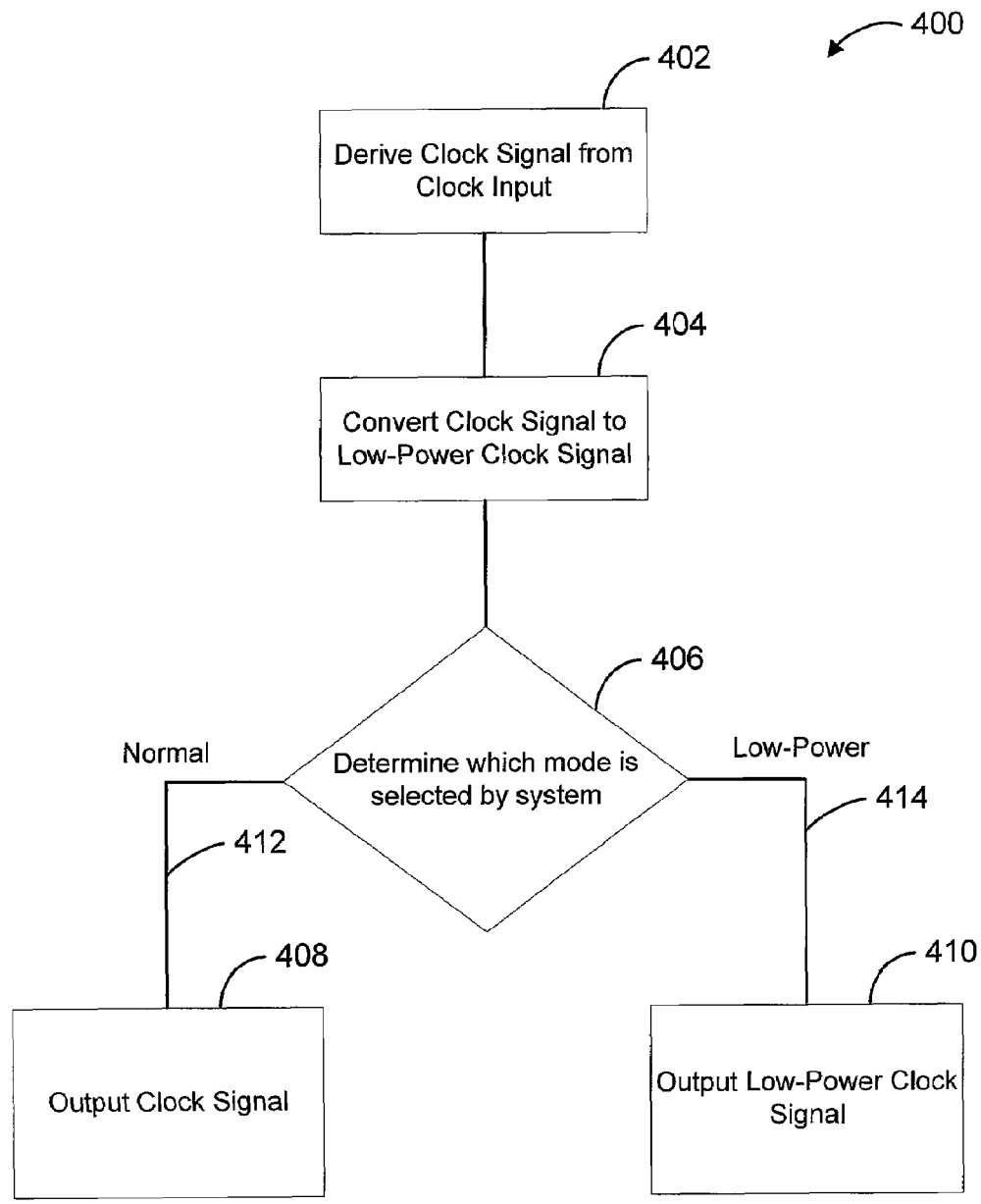
FIG. 5 is a flowchart diagram of illustrating a method embodiment of the disclosure.

FIG. 5 illustrates a flowchart demonstrating logical steps 400 of one embodiment of the system. A programmable clock divider circuit will derive a clock signal from a clock input at an initial derivation stage 402, and a divider circuit will convert the clock signal to a low-power clock signal at a low-power derivation stage 404. Both the clock signal and the low-power clock signal are retained, and one of the two clock signals will be outputted to serve as the clock. At the selection stage 406 the system determines whether the computer system desires the low-power clock signal 414 or the normal clock signal 412, which can equate to low-power or normal performance mode, respectively, and outputs the proper signal to serve as the clock. The system can output either the normal clock signal at stage 408 or the low-power clock signal at stage 410.

The initial derivation stage 402 can represent the derivation of a clock signal from a clock source, like the programmable core clock divider 204 in FIG. 2, or, alternatively, it can represent the derivation of a clock signal from another input, like the programmable system bus clock divider 206 in FIG. 2. As a non-limiting example of an alternative input, another clock or clock signal can act as the input, particularly in systems where a synchronous clock is desired or required and the one or more clocks of a computer system are arranged in a cascading fashion as in FIG. 2. The method depicted in FIG. 5 offers a less complex and time-consuming method of reducing a clock frequency to reduce the power consumption in a computer system relative to reprogramming a programmable clock divider circuit to produce a clock with a lowered frequency. The exemplary method further does not disrupt or alter any downstream clock generation in systems arranged in a cascading fashion, nor does it disrupt the synchronization of a computer system's clocks in systems where synchronous clocks are desired because at the initial derivation stage 402, the derived signal is preserved so that it can be used as the input to derive another of a computer system's clocks.

The invention claimed is:

1. A circuit for generating multiple clocks for a computer system, comprising:
a first programmable clock divider configured to accept a clock source and output a first clock signal;
a first non-programmable divider circuit configured to accept the first clock signal and output a first divided clock signal of a lower frequency relative to the first clock signal;
a first switching circuit configured to accept the first divided clock signal and the first clock signal as inputs and output one of the inputs as a first output clock in response to a first switching signal;
a second programmable clock divider configured to accept the first clock signal and output a second divided clock signal;
a second non-programmable divider circuit configured to accept the second clock signal and output a second divided clock signal of a lower frequency relative to the second clock signal; and
a second switching circuit configured to accept as inputs the second divided clock signal and the second clock signal and output one of the inputs as a second output clock in response to a second switching signal.

2. The circuit of claim 1, further comprising:
a third programmable clock divider configured to accept the second clock signal and output a third divided clock signal;
a third divider circuit configured to accept the third clock signal and output a third divided clock signal of a lower frequency relative to the first clock signal; and
a third switching circuit configured to accept as inputs the third divided clock signal and the third clock signal and output one of the inputs as a third output clock in response to a third switching signal.

3. The circuit of claim 2, wherein the first output clock is a core clock signal, the second output clock is a system bus clock signal, and the third output clock is a peripheral clock signal.

4. The circuit of claim 2, wherein the first divider circuit, the second divider circuit, and the third divider circuit are divide-by-N circuit, wherein N is a number greater than 1.

5. The circuit of claim 2, wherein the first switching circuit, the second switching circuit, and the third switching circuit comprise at least one chosen from: a substantially glitch-free clock switch and a multiplexer.

6. The circuit of claim 1, wherein the first switching circuit comprises at least one chosen from: a substantially glitch-free clock switch and a multiplexer.

7. The circuit of claim 1, wherein the first divider circuit is a divide-by-N circuit, wherein N is a number greater than 1.

8. A method executed in a circuit for generating multiple clocks for a computer system, comprising:

dividing a clock source programmably via a programmable divider circuit and deriving a first clock signal;

further dividing the first clock signal into a first low-power clock signal via a non-programmable divider circuit;

selecting one of the first clock signal and the first low-power clock signal based on a first clock switch selection signal as a first output clock;

dividing the first clock signal programmably and deriving a second clock signal;

further dividing the second clock signal into a second low-power clock signal;

inputting the second clock signal and the second low-power clock signal into a second clock switch configured by a second clock switch selection signal to select an output from among its inputs; and selecting one from among the second clock signal and the second low-power clock signal with the second clock switch selection signal and outputting it as the second output clock.

9. The method of claim 8, further comprising:
inputting the first clock signal and the first low-power clock signal into a first clock switch configured by a first clock switch selection signal to select an output from among its inputs.

10. The method of claim 8, wherein the first output clock is a core clock.

11. The method of claim 8, wherein the first clock signal is divided by N to produce the first low-power clock signal, wherein N is a number greater than 1.

12. The method of claim 8, further comprising:
dividing the second clock signal programmably and deriving a third clock signal;

further dividing the third clock signal into a third low-power clock signal;

inputting the third clock signal and the third low-power clock signal into a third clock switch configured by a third clock switch selection signal to select an output from among its inputs; and selecting one from among the third clock signal and the third low-power clock signal with the third clock switch selection signal and outputting it as the third output clock.

13. The method of claim 12, wherein the first output clock is a core clock signal, the second output clock is a system bus clock, and the third output clock is a peripheral clock.

14. The method of claim 12, wherein the first clock signal is divided by N to produce the first low-power clock signal, wherein N is a number greater than 1.

15. A circuit for generating multiple clocks comprising:
a clock source;
first, second, and third clock divider circuits being serially arranged with the clock source;
a fourth clock divider circuit being serially arranged with the first clock divider circuit;
a fifth clock divider circuit being serially arranged with the second clock divider circuit;
a sixth clock divider circuit being serially arranged with the third clock divider circuit;
a first clock selector having two inputs and an output, wherein the output of the first clock selector is configured to output a signal carried on one of the two inputs of the first clock selector, and wherein one input is connected to the first clock divider circuit and the second input is connected to the fourth clock divider circuit;
a second clock selector having two inputs and an output, wherein the output of the second clock selector is configured to output a signal carried on one of the two inputs of the second clock selector, and wherein one input is connected to the second clock divider circuit and the second input is connected to the fifth clock divider circuit; and
a third clock selector having two inputs and an output, wherein the output of the third clock selector is configured to output a signal carried on one of the two inputs of the third clock selector, and wherein one input is connected to the third clock divider circuit and the second input is connected to the sixth clock divider circuit, wherein the first, second, and third clock selectors are configured to operate independently.

16. The circuit of claim 15, wherein the first clock divider circuit, the second clock divider circuit, and the third clock divider circuit are programmable clock dividers.

17. The circuit of claim 15, wherein the fourth clock divider circuit, the fifth clock divider circuit, and the sixth clock divider circuit are divide-by-N circuit, wherein N is a number greater than 1.

18. The circuit of claim 15, wherein the first, second, and third clock selectors are at least one chosen from: a substantially glitch-free clock switch and a multiplexer.

19. The circuit of claim 18, wherein the output of the first clock selector is a core clock, the output of the second clock selector is a system bus clock, and the output of the third clock selector is a peripheral clock.

20. A circuit for generating multiple clocks comprising:
a plurality of clock processing units,
each of said plurality of clock processing units further comprises:
a programmable core clock divider configured to receive a clock source and output a first clock signal based on one or more instructions;
a non-programmable divide-by-N circuit configured to receive the clock source and output a low-power clock signal, wherein N is a number greater than 1;
a clock selector having two inputs and an output, wherein the output of the clock selector is configured to output a signal carried on one of the two inputs of the clock selector, and wherein one input is connected to the output of the divide-by-N circuit and the second input receives the first clock signal; and
wherein the output of the programmable clock divider of one of the plurality of clock processing units is the clock source for a second of the plurality of clock processing units.

21. The circuit of claim 20, wherein the clock selector in the at least one clock processing unit is chosen from: a substantially glitch-free clock switch and a multiplexer.

* * * * *